(12) United States Patent
Schaub et al.

(10) Patent No.: US 8,334,490 B2
(45) Date of Patent: Dec. 18, 2012

(54) OFF-AXIS REFLECTIVE TRANSMIT TELESCOPE FOR A DIRECTED INFRARED COUNTERMEASURES (DIRCM) SYSTEM

(75) Inventors: Michael P. Schaub, Tucson, AZ (US);
Daniel W. Brunton, Tucson, AZ (US);
Jim R. Hicks, Tucson, AZ (US);
Gregory P. Hanauska, Tucson, AZ (US); Ronald L. Roncone, Vail, AZ (US); Richard C. Juergens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 649 days.

(21) Appl. No.: 12/578,663

(22) Filed: Oct. 14, 2009

(65) Prior Publication Data
US 2011/0084195 A1   Apr. 14, 2011

(51) Int. Cl.
*G01J 1/20* (2006.01)
(52) U.S. Cl. ............... 250/203.6; 250/201.9; 244/3.16; 359/216.1
(58) Field of Classification Search ............... 250/203.6, 250/201.9; 244/3.16; 359/216.1
See application file for complete search history.

(56) References Cited

U.S. PATENT DOCUMENTS

| | | | | |
|---|---|---|---|---|
| 5,946,143 | A * | 8/1999 | Whalen | 359/728 |
| 6,201,230 | B1 * | 3/2001 | Crowther et al. | 250/203.6 |
| 6,462,889 | B1 * | 10/2002 | Jackson | 359/728 |
| 7,304,296 | B2 | 12/2007 | Mills | |
| 7,336,407 | B1 | 2/2008 | Adams | |
| 7,378,626 | B2 | 5/2008 | Fetterly | |
| 2002/0153497 | A1 | 10/2002 | Pepper | |
| 2003/0098387 | A1 * | 5/2003 | Baumann et al. | 244/3.13 |
| 2006/0028737 | A1 * | 2/2006 | Sparrold | 359/754 |
| 2007/0075182 | A1 * | 4/2007 | Fetterly | 244/3.16 |
| 2007/0075237 | A1 | 4/2007 | Mills | |
| 2008/0042042 | A1 * | 2/2008 | King et al. | 250/201.9 |
| 2008/0239060 | A1 | 10/2008 | Jo | |
| 2010/0020307 | A1 * | 1/2010 | Kunick | 356/5.01 |
| 2012/0018614 | A1 * | 1/2012 | King et al. | 250/201.9 |

FOREIGN PATENT DOCUMENTS

WO    9903022 A1    1/1999

* cited by examiner

*Primary Examiner* — Georgia Y Epps
*Assistant Examiner* — Kevin Wyatt
(74) *Attorney, Agent, or Firm* — Eric A. Gifford

(57) ABSTRACT

An off-axis reflective transmit telescope for a DIRCM system is mounted on the gimbal along a transmit-axis offset laterally from the optical axis of the receive telescope but nominally aligned with the line-of-sight of the receive telescope to transmit a laser beam. The telescope comprises an optical port optically coupled to a laser to receive and direct the laser beam away from the dome and a reflective optical assembly that reflects the laser beam through the dome. The reflective optical assembly comprises an off-axis mirror segment and a second optical element that together precompensate the laser beam for dome aberrations induced by the lateral offset of the transmit telescope's transmit axis from the optical axis. The off-axis mirror segment comprises a segment of a parent mirror having an aspheric curvature (e.g. parabolic, elliptical or higher-order asphere) about an axis of symmetry. The segment is offset so that it is not centered on the axis of symmetry of the parent mirror. The use of the off-axis mirror segment allows the optical port and any folding mirror to be positioned so that they do not obscure the reflected laser beam. The second optical element may be a segment of a dome corrector parent lens, a prism or a refractive lens formed on the front surface of the off-axis minor segment.

11 Claims, 16 Drawing Sheets

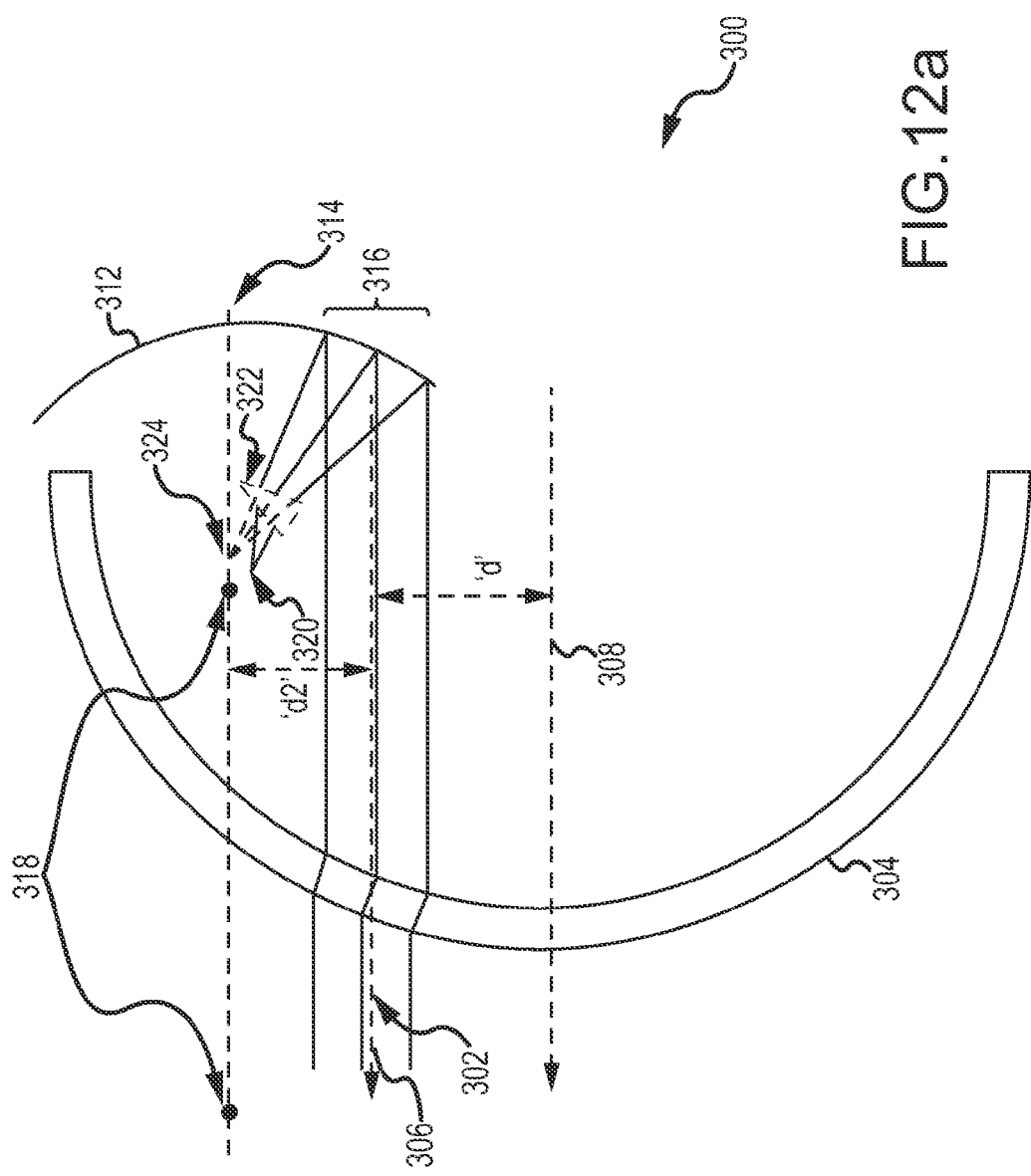

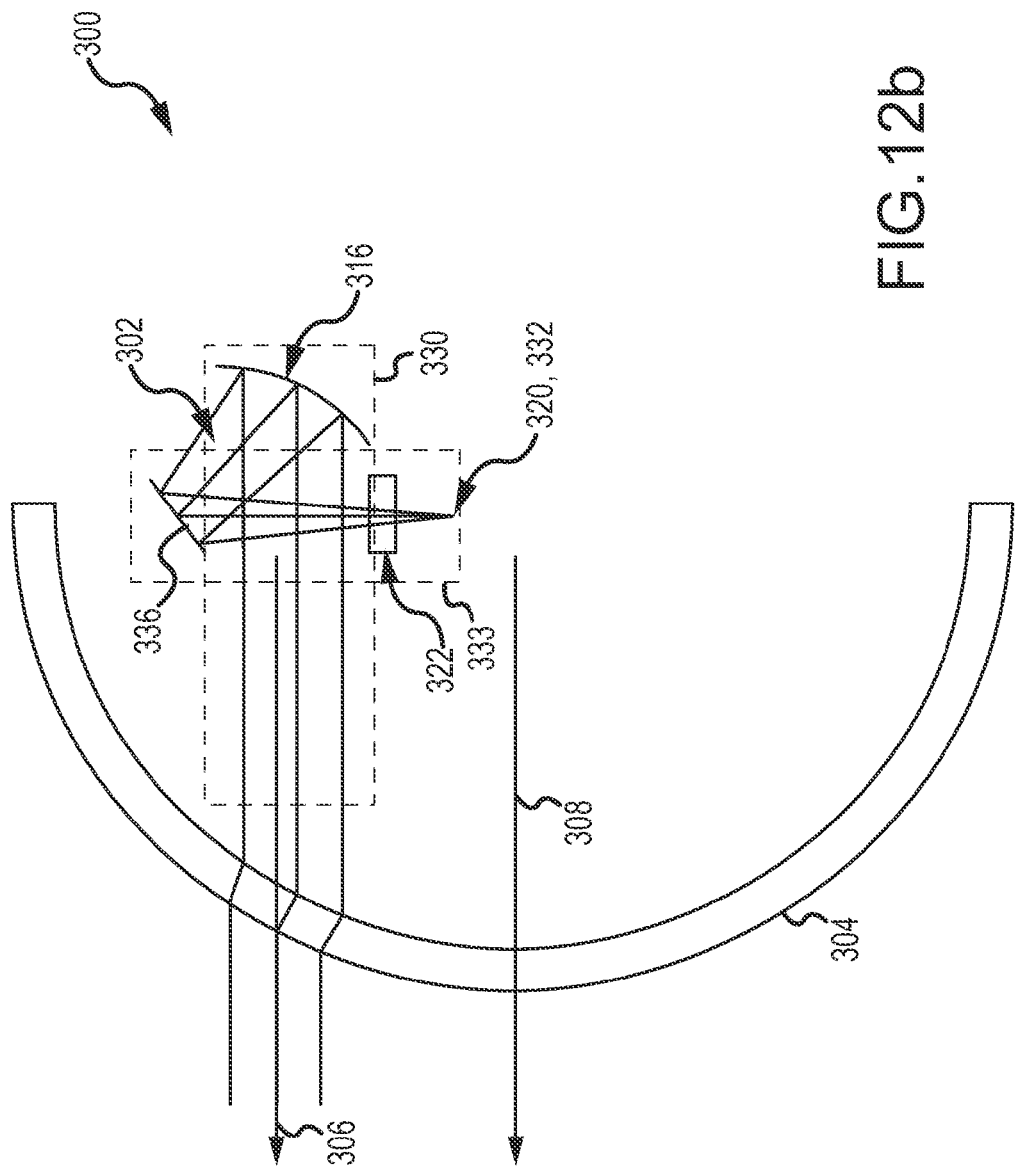

OFF-AXIS REFLECTIVE TRANSMIT TELESCOPE FOR A DIRECTED INFRARED COUNTERMEASURES (DIRCM) SYSTEM

BACKGROUND OF THE INVENTION

1. Field of the Invention

This invention relates to directed infrared countermeasure (DIRCM) systems for use with commercial aircraft to effectively counter MANPADS and more advanced threats, and more particularly to a transmit telescope for directing the laser on target 2. Description of the Related Art The proliferation of shoulder-launched missiles known as MANPADS for "Man-Portable Air-Defense System" and their availability to terrorists present a real threat to military aircraft and particularly commercial aircraft. Estimates of the number of attacks on commercial aircraft vary, running as high as 43 hits on civilian aircraft—with 30 of these resulting in aircraft kills and the loss of nearly 1,000 lives—since the 1970s. More than half a million MANPADS have been delivered worldwide, and many of these are still operational. These missiles currently use infrared (IR) seekers to track and lock-on to the aircraft. The missiles typically have a range of 5-8 km and can reach an altitude of approximately 12,000 ft. Historically, countermeasures range from active IR jamming to flares and chaff.

As illustrated in FIGS. 1 and 2, a terrorist 10 holds a MANPADS 12 on his or her shoulder, points it at the aircraft 14 and launches the missile 16. A typical missile 16 will typically progress through the eject, boost, sustain and possibly post-burn stages before impacting the aircraft. The missile's IR seeker 18 tracks IR energy emitted by the aircraft 14. The seeker processes the infrared scene containing the target and generates target tracking information 22 that guides the missile 16 enabling the seeker to track hot targets like aircraft 14. The aircraft's DIRCM system 24, suitably mounted in a "blister pack" near the rear of the aircraft, must detect, verify, track and then emit a modulated laser beam 26 or eject flares that produce a false signature 28 to jam the missile's IR seeker. The purpose of either approach is to generate a false target with a "miss distance" from the aircraft. The DIRCM system will typically try to detect the missile at ejection based on the eject motor's impulse signature, verify the threat and track the heat plume 30. The DIRCM system is particularly stressed when the shot is taken from close range such as might be the case on take-off or landing or when multiple simultaneous shots are taken at the aircraft. This later case being taught to terrorists undergoing formal training.

U.S. Pat. No. 7,378,626 discloses an agile, high-power, reliable DIRCM system that is easily extended to address sophisticated UV or UV-visible capable multi-band threats. The DIRCM system includes a missile warner having missile warning receivers (MWRs), one or two-color suitably in the mid-IR range, that detect likely missile launch and pass the threat coordinates to a pointer-tracker having a Roll/Nod gimbal on which the IR laser transmitter is mounted. The pointer-tracker stews the gimbal to initiate tracking based on the threat coordinates and then uses its detector to continue to track and verify the threat. If the threat is verified, the pointer-tracker engages the laser to fire and jam the missile's IR seeker. By slewing the gimbal based on unverified threat coordinates to initiate tracking the system is highly agile and can respond to short and near simultaneous MANPADS shots. The laser transmit telescope(s) is mounted off-axis from the Roll/Nod gimbal axes (i.e. a lateral offset from optical axis of the receive telescope) to avoid backscatter from the laser into the pointer-tracker's detector. Conformal optics (multi-element on-axis refractive optics) is used to minimize the distortion through the spherical dome caused by the off-axis mounting. U.S. Pat. No. 7,304,296 discloses a continuous optical fiber assembly to couple the off-gimbal laser to the on-gimbal transmit telescope.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an off-axis reflective transmit telescope for a DIRCM system. The transmit telescope is mounted on the gimbal along a transmit axis offset laterally from the optical axis of the receive telescope but nominally aligned with the line-of-sight of the receive telescope to transmit a laser beam. The telescope comprises an optical port offset from the transmit axis and optically coupled to the laser to receive and emit the laser beam and a reflective optical assembly that reflects the laser beam through the dome. The reflective optical assembly comprises an off-axis mirror segment on the transmit axis and a second optical element that together precompensate the laser beam for dome aberrations induced by the lateral offset of the transmit telescope's transmit axis from the optical axis. The off-axis mirror segment comprises a segment of a parent mirror having an aspheric base curvature about an axis of symmetry. The segment is offset so that it is not centered on the axis of symmetry of the parent mirror. The use of the off-axis mirror segment allows the optical port and any folding mirror to be positioned so that they do not obscure the reflected laser beam.

In a first embodiment, the reflective optical assembly comprises an off-axis mirror segment having a parabolic base curvature that reflects and collimates the laser beam and an off-axis dome corrector lens segment that precompensates the collimated beam for the dome aberrations. The off-axis mirror segment comprises a segment of a parent mirror having a parabolic base curvature about an axis of symmetry in which the segment corresponds to an offset from the axis of symmetry whereby the optical port does not obscure the reflected and collimated laser beam. The optical port (or an image thereof) is positioned at a point on the axis of symmetry at a distance of half the radius of curvature of the parabola so that the reflective laser beam is collimated. The off-axis dome corrector lens segment comprises a segment of a parent meniscus lens that corrects aberrations over the dome. The segment corresponds to the lateral offset of the transmit telescope from the optical axis. The parent mirror, hence mirror segment may be designed to include higher order aspheric terms on the parabolic base curvature to provide additional aberration correction.

In a second embodiment, the reflective optical assembly comprises a prism that precompensates the laser beam for the chromatic aberration and induces another standard aberration and an off-axis mirror segment having an elliptical base that reflects the laser beam removing the standard aberration induced by the prism and precompensating the beam for the dome standard aberration. The off-axis mirror segment comprises a segment of a parent mirror having an elliptical base curvature with first and second foci on an axis of symmetry. The mirror segment corresponds to an offset from the axis of symmetry whereby the optical port (or an image thereof) lying off said first and second foci and the prism do not obscure the reflected laser beam. The parent mirror, hence mirror segment may be designed to include higher order aspheric terms on the elliptical base curvature to provide additional aberration correction.

In a third embodiment, the reflective optical assembly comprises an optical element having an off-axis refractive front surface and an off-axis reflective back surface having different higher-order aspheric curvatures that are tilted and decentered with respect to each other and with respect to the transmit axis. The laser beam passes through the refractive front surface reflects off the reflective back surface and passes back through the refractive front surface to precompensate the reflected laser beam for the dome aberrations. The off-axis refractive front surface and the off-axis refractive back surface mirror comprise different segments of an aspheric parent lens and an aspheric parent mirror, respectively, corresponding to different offsets from the axes of the parent lens and parent mirror whereby the refractive and reflective surfaces are decentered with respect to each other and the optical port (or an image thereof) does not obscure the reflected laser beam along the transmit axis.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 12a and 12b are diagrams illustrating a side-view of a second embodiment including a prism and an off-axis elliptical mirror segment.

DETAILED DESCRIPTION OF THE INVENTION

The present invention describes an off-axis reflective transmit telescope for a DIRCM system. The transmit telescope is mounted on the gimbal along a transmit-axis offset laterally from the optical axis of the receive telescope but nominally aligned with the line-of-sight of the receive telescope to transmit a laser beam. The telescope comprises an optical port offset from the transmit axis and optically coupled to the laser to receive and emit the laser beam and a reflective optical assembly that reflects the emit laser beam through the dome. The reflective optical assembly comprises an off-axis mirror segment and a second optical element that together precompensate the laser beam for dome aberrations induced by the lateral offset of the transmit telescope's transmit axis from the optical axis. The off-axis mirror segment comprises a segment of a parent mirror having an aspheric curvature (e.g. parabolic, elliptical or higher-order aspheres) about an axis of symmetry. The segment is offset so that it is not centered on the axis of symmetry of the parent mirror. The use of the off-axis mirror segment allows the optical port and any folding mirror to be positioned so that they do not obscure the reflected laser beam. The second optical element may be an off-axis segment of a dome corrector parent lens, a prism or an off-axis segment of a refractive lens.

Without loss of generality, the off-axis reflective transmit telescope will be described in the context of the DIRCM system presented in related U.S. Pat. No. 7,378,626. It will be understood by those skilled in the art that the off-axis reflective transmit telescope of the present invention may be used in other configurations of a DIRCM system in which the transmit telescope is offset from the optical axis of the receive telescope.

DIRCM System

Figure 1:
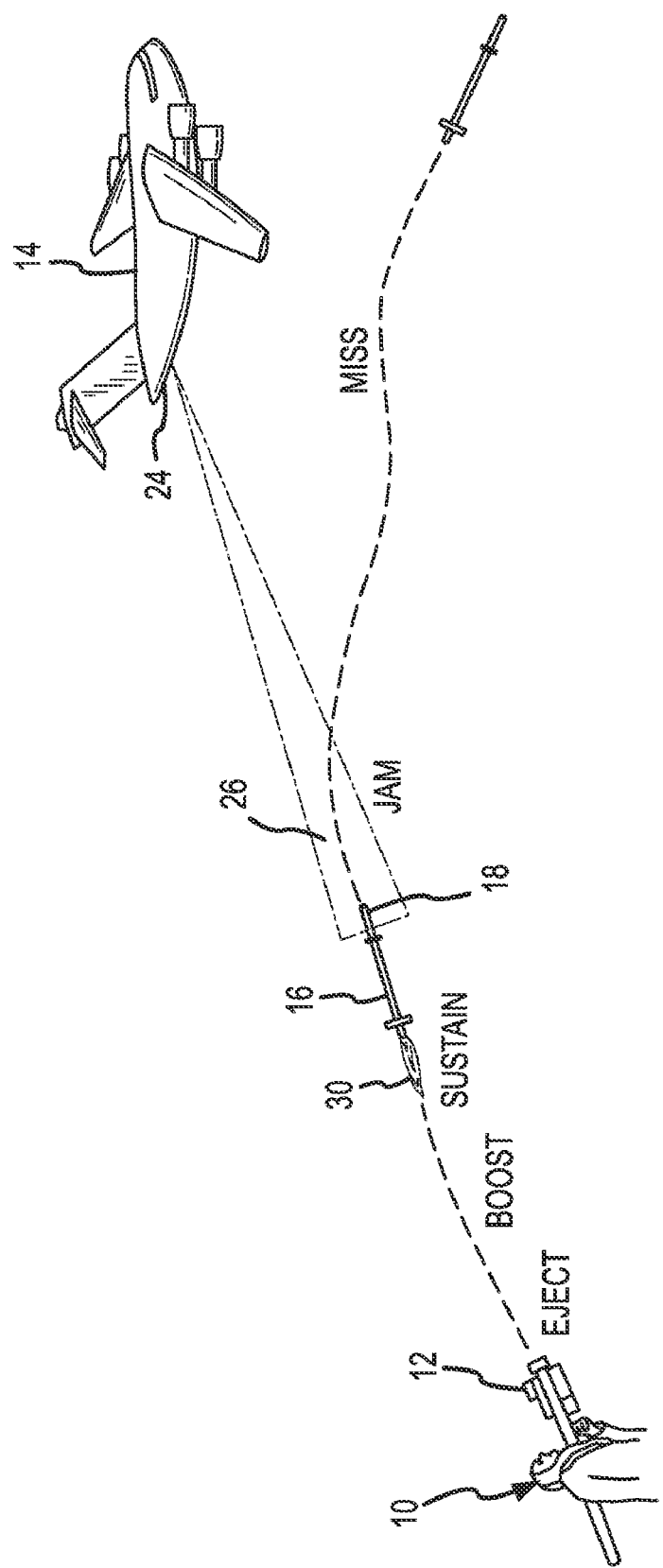
FIG. 1, as described above, is a diagram of a MANPAD missile launch and effective jamming by a DIRCM on an aircraft.
Figure 2:
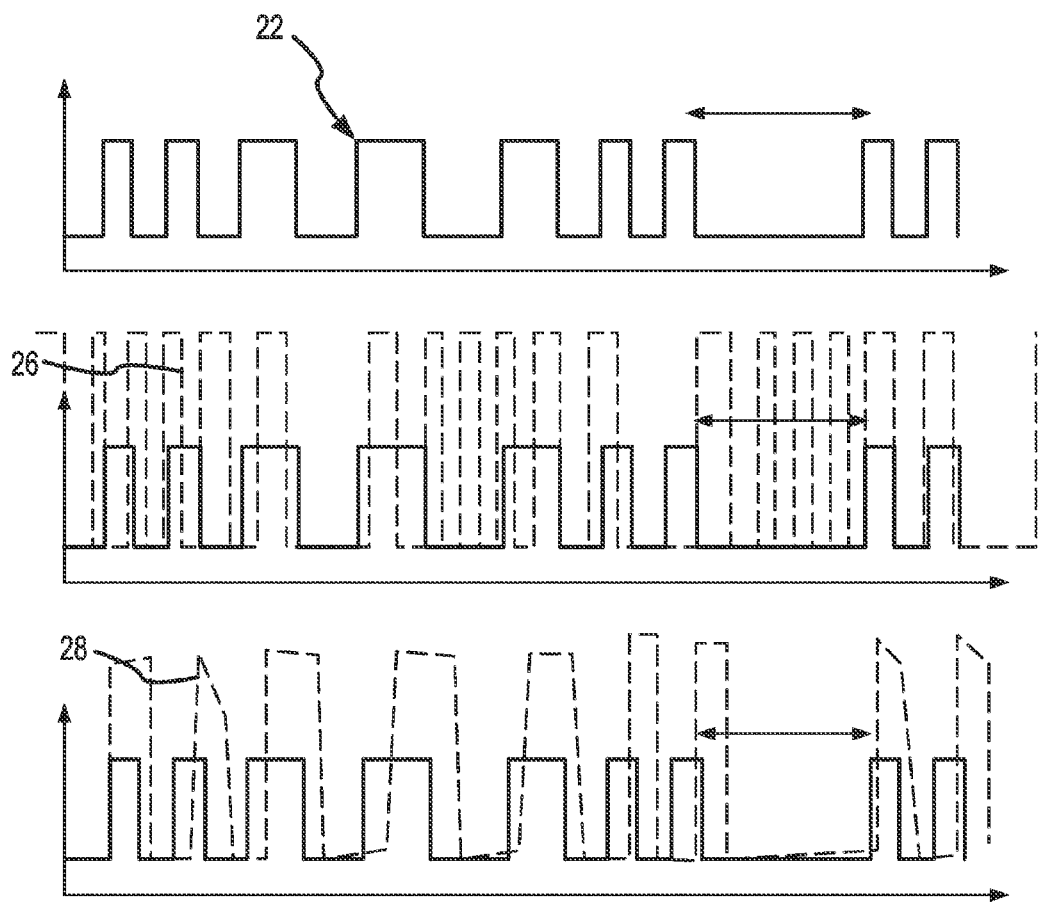
FIG. 2, as described above, illustrates the principles of jamming.
Figure 3:
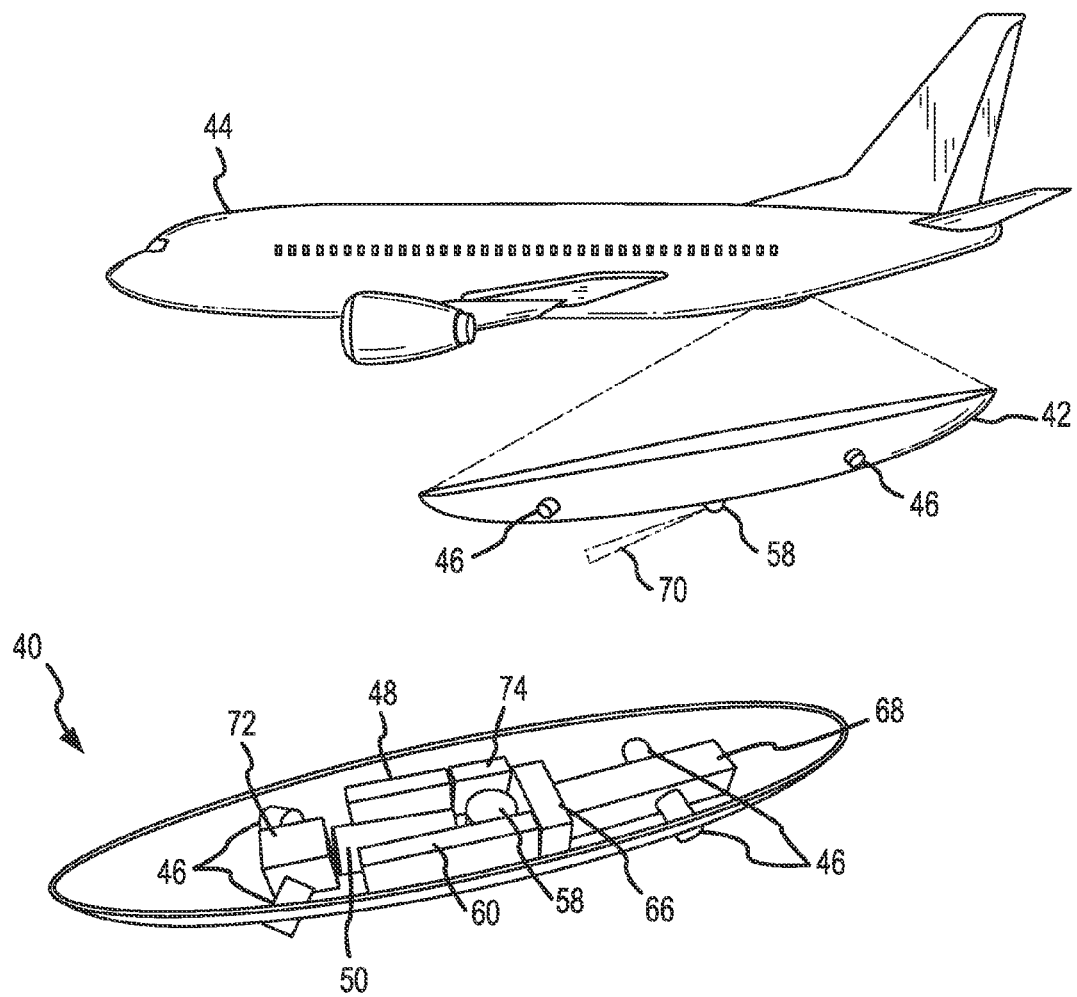
FIG. 3 is a simplified diagram of a blister pack for a DIRCM system in accordance with the present invention mounted near the tail of the aircraft.
Figure 4:
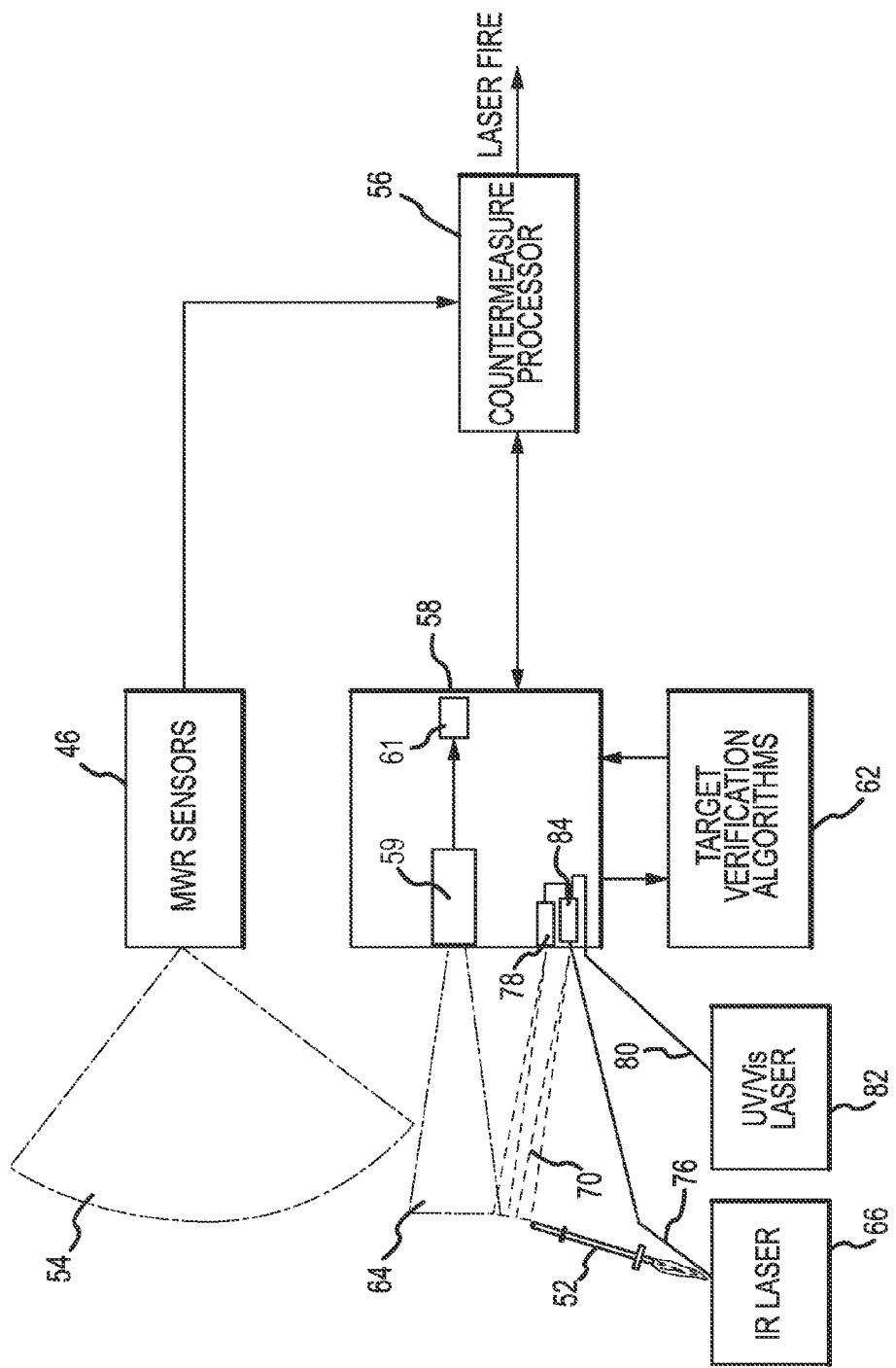
FIG. 4 is a block diagram of the steps implemented by the DIRCM system for detecting, tracking and jamming the missile.

As shown in FIGS. 3 and 4, an exemplary DIRCM 40 is integrated in a blister package 42 and mounted towards the rear of the aircraft 44. A missile warning system (MWS) includes multiple, suitably four, one or two-color missile warning receivers (MWR) 46, a MWS power supply 48, and a missile warning processor included in the system controller 50. In a one-color system the MWRs suitably detect in the 3.5-4.8 micron band in the mid-wave infrared (MWIR). In a two-color system the MWRs suitably detect in the 3.5-3.7 and 4.2-4.8 micron bands in the MWIR. The MWS detects a likely missile launch 52 over a wide field-of-view (FOV) 54, identifies potential threats to the aircraft and passes the threat coordinates to a countermeasure processor 56 also included in the system controller 50. The MWS is optional in that other techniques may be employed to identify potential threats and pass the initial threat coordinates to the countermeasure processor.

The counter measure processor 56 passes the threat coordinates to a gimbaled pointer-tracker 58 powered by power supply 60. The pointer-tracker includes a receive telescope 59 and a detector 61. The tracker may utilize a one-color detector but preferably uses a two-color detector to improve detection range and reduce false alarm rates. Both one and two color detectors suitably detect in the 3-5 micron band of MWIR. The gimbaled pointer-tracker (see FIG. 5) slews to initiate tracking based on the threat coordinates. After stewing has been initiated, the pointer-tracker preferably uses target verification algorithms 62, preferably two-color, to continue tracking within a narrow FOV 64 and verify the threat. A two-color algorithm exploits the differences in spectral content and scene dynamics between a missile and background clutter to verify the target.

If the threat is verified, the pointer-tracker 58 notifies the countermeasure processor 56, which engages an IR laser 66 (powered by laser power supply 68) to fire a modulated laser beam 70 and jam the missile's IR seeker. The primary IR laser suitably operates in bands 2, 3, or 4 (e.g., the short and mid infrared bands). The blister pack also suitably includes a flight data recorder 72 that records DIRCM system data and event data including MWS video of classified threat(s) and Pointer-Tracker video of engagement and an aircraft avionics interface subsystem 74 that directs power, control and status signals to and from aircraft avionics and notifies the aircraft of an attack and the action taken.

A fiber assembly 76 is preferably used to couple the output of the laser 66 to the input of an off-axis reflective transmit telescope 78 mounted on the gimbal. The fiber assembly is suitably routed around the gimbal pivot and off the Roll/Nod gimbal axes. A continuous fiber path reduces loss and damage associated with segmented fiber assembly or free-space optical interfaces although either may be used. By routing the fiber path around the gimbal axes, a second fiber assembly 80 can be routed along the fiber path to couple a UV/visible laser 82, suitably UV to near IR (approximately 0.28 microns to 0.7 microns), to an off-axis reflective transmit telescope 84 mounted on the gimbal. The IR and UV/visible lasers may share a common transmit telescope and may share a common fiber assembly. The laser transmitter(s) are laterally offset from optical axis of the receive telescope to avoid backscatter from the laser into the pointer-tracker's detector 61. The receive and transmit telescopes may share only the dome as a common optical element. The transmit telescope includes an off-axis mirror segment to avoid obscuring the transmitted laser beam and a second optical element that either independently or together with the mirror segment minimize the distortion (chromatic and standard aberrations) through the gimbal's spherical dome caused by the lateral offset mounting.

By slewing the gimbal based on unverified threat coordinates to initiate tracking the system is highly agile and can respond to short and near simultaneous MANPADS shots. As described below, a light weight, agile pointer-tracker such as an AIM-9X Imaging Seeker may be modified for use in the DIRCM system. The AIM-9X Imaging Infrared Roll/Nod Seeker is the latest in a long line of seekers developed for the Sidewinder family of air-to-air missiles which stretches back to the mid '50s. The seeker uses imaging infrared to create an IR image of target and background. The detected infrared image is fed to the processor that determines target from background clutter and tracks the target. The processor performs the same functions when exercising the Infrared Counter-countermeasure (IRCCM) logic that isolates countermeasures from the target. Other Pointer-Trackers may be modified or designed to provide similar functionality and attributes as the AIM-9X. The AIM-9X was selected because it is available in large quantities and provides the necessary features for use in the DIRCM system. The production rate for the AIM-9X seeker can be ramped up to meet both military and commercial aviation needs as the modifications to the AIM-9X seeker converting it to a DIRCM are minimal. Alternately, other known seeker configurations may be modified to provide the required functionality or a gimbaled pointer-tracker may be designed specifically for the DIRCM system. For example, the roll and nod gimbals could be reversed and the receive and transmit telescopes mounted on the roll gimbal, the detector or laser sources could be mounted on gimbal or the free space receive optical path could be replaced with a fiber assembly.

Figure 5:
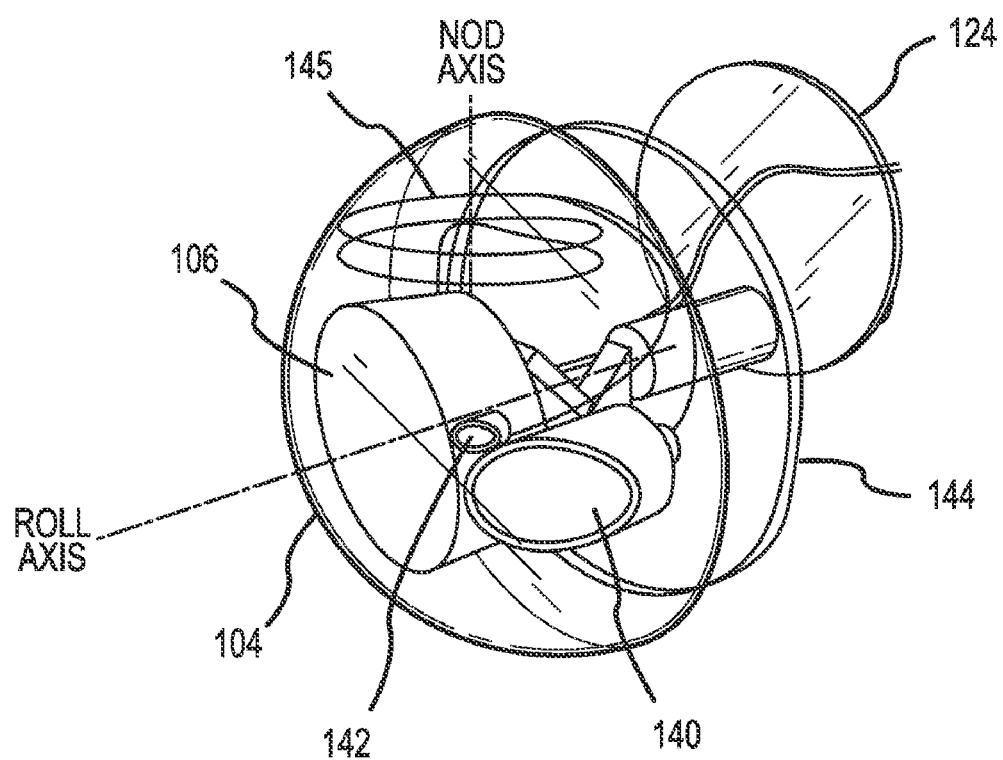
FIG. 5 is a diagram of the gimbaled pointer-tracker including a pair of off-axis reflective transmit telescopes in accordance with the present invention.
Figure 6:
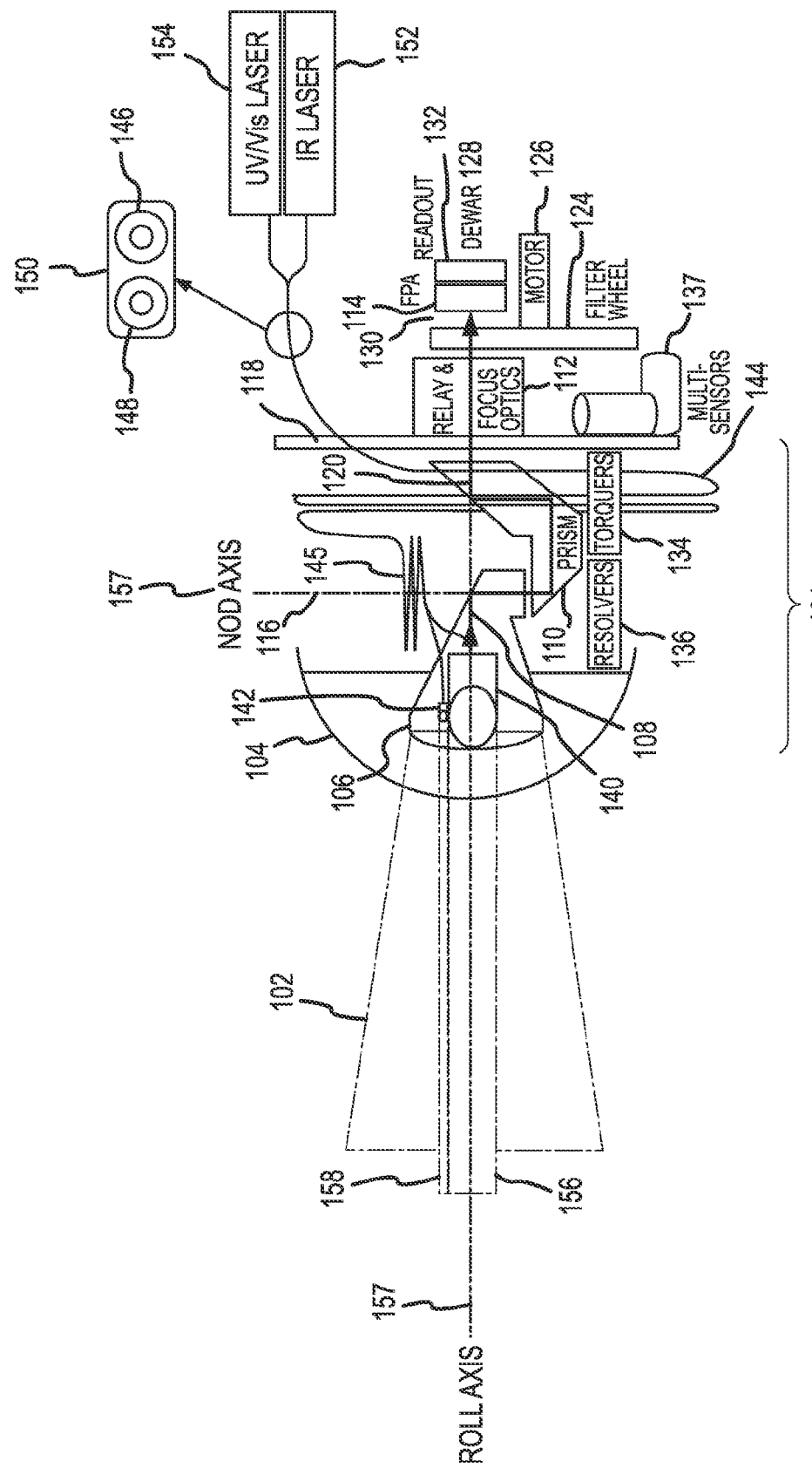
FIG. 6 is a schematic diagram of a modified AIM-9X pointer-tracker.
Figure 7:
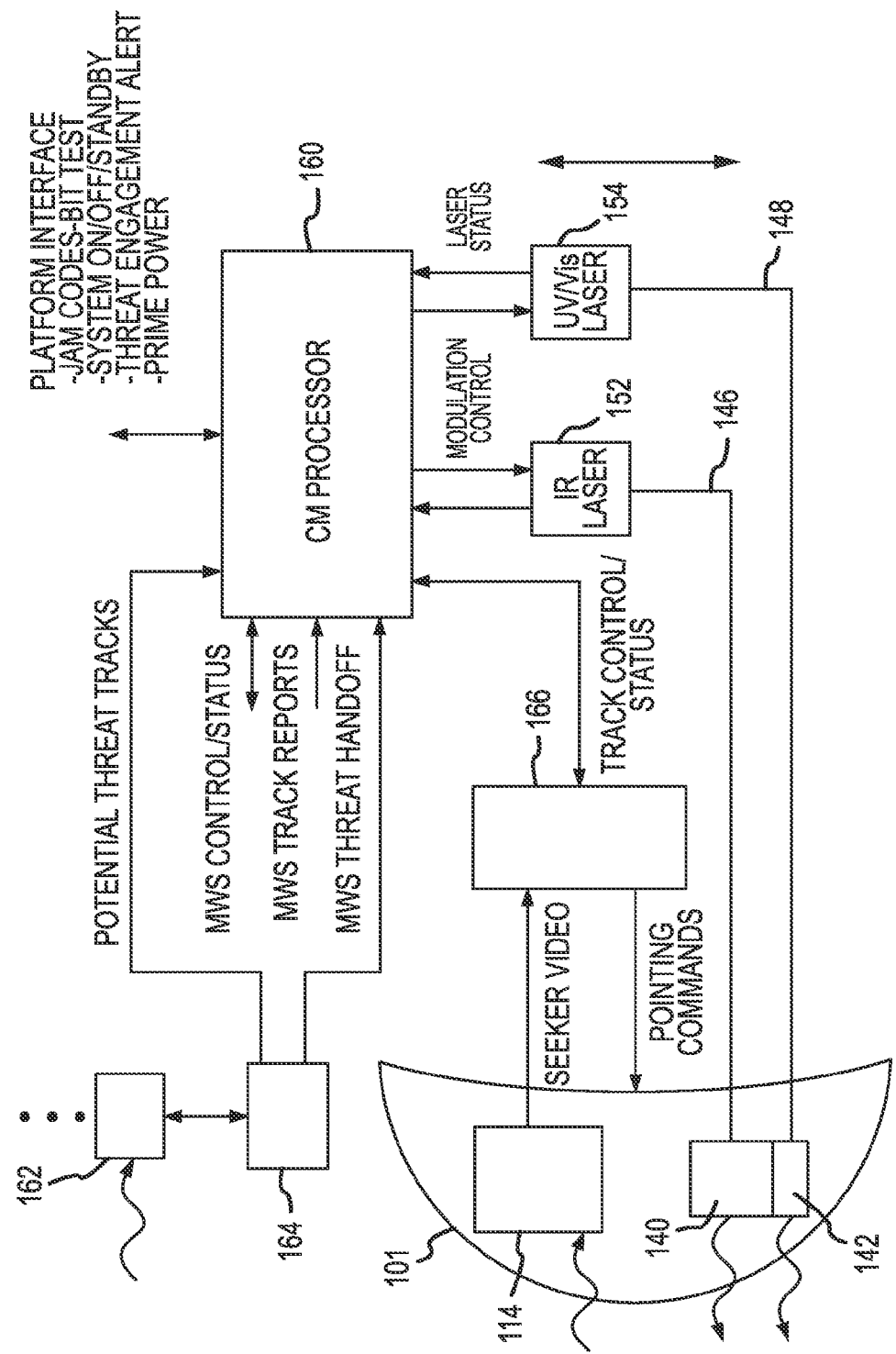
FIG. 7 is a block diagram of the operation of the AIM-9X countermeasure processor.

As illustrated in FIGS. 5 through 7, in an embodiment an AIM-9X Imaging Seeker 100 has been modified for use in the DIRCM system 40 to detect, track, verify and jam a threat such as a shoulder launched missile. The seeker's Roll/Nod gimbal 101 includes all of the mechanical components forward of the bulkhead that articulate in the roll and nod axes. The optical components in the standard AIM-9X seeker head and the additional optical components for transmitting a jam laser beam(s) are mounted on the gimbal.

Infrared energy enters the seeker gimbal 101 over a wide FOV 102, suitably 10s of milliradians, through a dome 104. Sapphire was selected as a suitable material for the AIM-9X dome for its scratch resistance and ability to withstand aerodynamic heating experienced during flight. A folded Afocal receive telescope 106 collects IR energy. The energy is collimated into a beam 108 and travels through a series of prisms 110 and relay and focus optics 112 to a Staring Focal Plane Array (FPA) 114. The prisms and optics are configured in such a way that they enable the seeker's gimbal to articulate in both roll and nod. As the energy 108 exits the folded Afocal Telescope it crosses the nod axis 116, enters the prism and is relayed to where it reaches the sealed bulkhead 118 where it crosses the roll axis 120. Beyond this point the optics and FPA detector are body fixed. Once past the gimbal's roll axis the energy 108 enters the relay and focus optics lens set 112. This set of optics forms the image on the FPA 114 located at the image plane of the focus optics. Located between the focus optics and FPA is a spinning filter wheel 124 that contains multiple filtering elements that select the spectral band in which the seeker operates. Filter selection is software driven and can change in real-time with the changing engagement by controlling motor 126. Spectrally optimized energy enters the vacuum Dewar 128 passes a cold stop 130, is imaged on, for example, a 128 by 128 Indium Antimonide staring FPA 114, and readout by readout circuit 132. The FPA is typically cooled by a Cryoengine (not shown) affording unlimited cooling during the mission.

The bulkhead 118 and fixed components of the seeker aft of the gimbal allow for high Off Boresight Angle (OBA) operation within the traditional 3 inch Sidewinder dome diameter. The Roll/Nod gimbal configuration provides superior target tracking. Off-Gimbal Inertial Seeker Assembly allows high slew rates. With the Roll/Nod gimbal the detector 114 is off-gimbal. There are no cryogenic lines that must cross the gimbals. The reduced on-gimbal mass and minimal spring torque allow the gimbal to be controlled by a high bandwidth control loop that drives the Roll/Nod torquer motors 134 enabling very high speed slewing and fast settling times for the seeker. Seeker pointing angle is measured by high precision resolvers 136. Sensors 137 measure gimbal positions and platform motion along the different axis.

The Imaging Seeker 100 is modified for use in the DIRCM 40 by outfitting it with the proper laser sources, fiber optics and laser transmit telescopes needed to jam the seeker on the inbound missile. The Sapphire dome 104 transmits energy from the Ultraviolet through mid-infrared so the DIRCM can transmit laser energy that is in-band to the most advanced multi-color threats that operate in multiple portions of the spectrum including the Ultraviolet. Materials other than Sapphire such as Germanate and Calcium Aluminate glasses may also provide the requisite mechanical and transmission properties. The two-color tracking algorithms used in the AIM-9X may be used without further modification.

The seeker's gimbal 101 is fitted with a multiband infrared off-axis reflective transmit telescope 140 and, in some cases, a UV/visible off-axis reflective telescope 142, offset laterally to and aligned with the folded Afocal receive telescope 106 line-of-sight. The threat missile is centered in the track frame, laying the transmit telescope's optical line of sight onto the missile. The optical centerlines of the AIM-9X Infrared tracker and the transmit telescope are co-aligned. Continuous IR fiber 146 and UV/visible fiber 148, suitably encapsulated in a flexible anti-chaffing/entanglement encapsulation 150, are used to couple the respective transmit telescopes to the output of the IR laser 152 and UV/visible laser 154, respectively. The encapsulated dual-fiber 150 is routed in a roll axis dual fiber service loop 144 off the gimbal pivot 157 and looped around the roll axis 120 and then in a nod axis dual fiber service loop 145 looped around the nod axis 116.

When directed to fire, the IR laser 152 fires an IR laser jam beam 156 that passes through IR fiber 146, is emitted by telescope 140 and transmitted through dome 104. The jam beam 156 is aligned with the seeker's line-of-sight on the target and has only a few milliradians of beam divergence. More sophisticated missiles can, once their IR seeker is jammed, switch to a UV/visible tracking mode. The DIRCM is simultaneously in concert with the IR laser commanding the UV/visible laser 154 to fire a UV/visible laser jam beam 158 that passes through UV/visible fiber 148, is emitted by telescope 142 and transmitted through dome 104. The jam beam 158 is aligned with the seeker's line-of-sight on the target and has only a few milliradians of beam divergence.

As modified, the Afocal receive telescope 106, laser transmitters 140 and 142 and fiber(s) 148 and 146 are mounted on the Nod axis 116. These in turn are attached to the relay prism 110. This entire assembly is mounted on the roll axis 120. IR energy 108 received by the Afocal telescope is transmitted off the gimbal via the prism that is on-gimbal and is firmly attached to the roll axis, into the off gimbal relay and focus optics that forms the image on the Focal Plane Array. In this configuration, the laser energy does not pass through the gimbal axes. The use of fibers 146 and 148 decouples the transmission of the laser energy from restrictions imposed by conventional free space optics and coupling methods. The use of fibers also enables simple low-cost upgrades to be made by enabling the use of multiple fibers to add additional laser emissions to be in-band of advanced threat missiles.

As shown in FIG. 7, a countermeasure (CM) processor 160 acts as the interface to the aircraft, monitors status and controls the operation of the DIRCM, specifically the slewing of the seeker's gimbal 101 to track the target and the firing of the IR laser 152 and/or UV/visible laser 154 upon verification of the threat. At power up the CM processor looks at the BIT test reports from each subsystem. Mission specific jam codes are down loaded to the laser control algorithms in the CM Processor. The CM processor powers up the respective subsystems depending on the mode the system is in.

The Missile Warning system includes multiple MWRs 162 that look for potential threats over much of $4\pi$ Steradian. A missile warning processor 164 processes the detected MWR images to identify possible threat tracks. Once detected, the potential threat partially developed track is passed to the CM Processor (MWS threat handoff), which passes the data onto the AIM-9X Tracker/System Interface 166 for verification of the threat.

The AIM-9X Tracker/System Interface 166 slews the modified seeker gimbal 101 to the point in space where the Missile Warning system detects a potential threat. The AIM-9X seeker using its advanced tracking algorithms in association with two color threat detection/verification algorithms verifies or eliminates the target track based on its characteristics.

If validated a threat validation message is sent to the CM Processor that then commands the two lasers to begin lasing using a default jam code or the mission specific code loaded at the time the system was powered up. Lasing of the threat missile seeker will continue until certain criteria are met as determined by the AIM-9X Tracker.

If multiple valid threats are detected and validated by AIM-9X the seeker will service the threat determined to be the highest threat then slew at high speed to the next threat. Track on the threats not being engaged by the AIM-9X is maintained and updated by the Missile Warning Subsystem. When a threat is validated and engaged and lasing takes place a Threat Engagement Alert message is sent to the platform indicating that a missile attack was detected and bearing(s) passed.

Off-Axis Reflective Transmit Telescope

The transmit telescope is an important component in the DIRCM system. The transmit telescope must form and maintain a collimated laser beam that can be directed onto the target missile. The telescope forms the collimated laser beam from a point source (e.g. the end of the optical fiber assembly that brings the laser beam from the laser across the gimbal to the telescope). The telescope also precompensates the laser beam for any aberrations induced by passing the beam through the dome at an offset from boresight. Because the transmit telescope is offset from boresight at the neutral gimbal position, the dome induces both a chromatic aberration and a standard aberration, primarily astigmatism. The telescope induces complementary aberrations so that the transmitted laser beam is collimated. It is to be understood that "collimated" includes both perfectly and substantially collimated to within the specifications required for a DIRCM system. The telescope is preferably configured to provide a high throughput of the laser beam and to handle multiple wavelengths in the same or different transmit bands (e.g. IR, UV, visible or SAL). The telescope is preferably simple, reliable and inexpensive.

Figure 8:
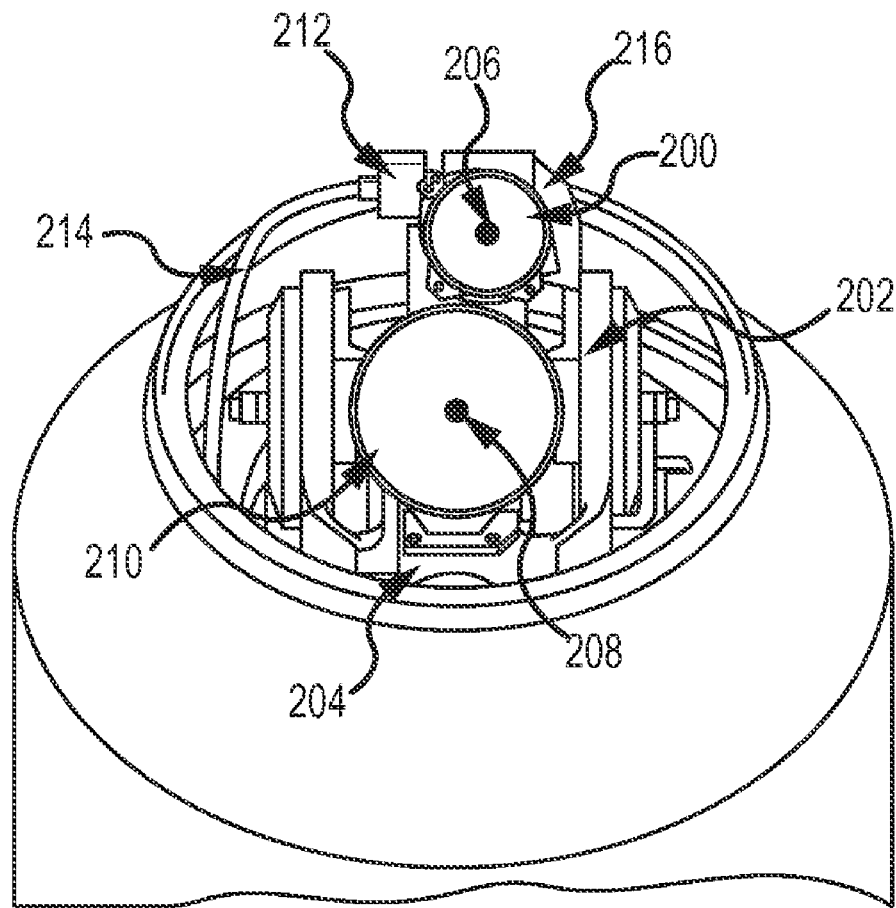
FIG. 8 is a diagram of the gimbaled pointer-tracker illustrating an off-axis reflective transmit telescope mounted with a lateral offset to the receive telescope.

As shown in FIG. 8, a transmit telescope 200 is mounted on a nod gimbal 202 of a roll-nod gimbal 204 along a transmit-axis 206 offset laterally from the optical axis 208 but nominally aligned with the line-of-sight of the receive telescope 210 to transmit a laser beam. Because of the lateral offset, the spherical dome (not shown) induces chromatic aberration and standard aberration, primarily astigmatism and to a lesser extent spherical aberration, into the laser beam. The off-axis reflective transmit telescope 200 suitably comprises a minimal number of optical elements that are arranged to provide high throughput and to precompensate for the dome aberrations for one or more transmit bands. The telescope comprises an optical port 212 optically coupled to the laser (by, for example, an optical fiber assembly 214) to receive and emit the laser beam and a reflective optical assembly 216 that reflects the laser beam through the dome.

As will be shown in FIGS. 9 through 13 for three different configurations, the reflective optical assembly 216 comprises an off-axis mirror segment and a second optical element that together precompensate the laser beam for dome aberrations. The off-axis mirror segment comprises a segment of a parent mirror having an aspheric curvature about an axis of symmetry. The segment is offset so that it is not centered on the axis of symmetry of the parent mirror. The use of the off-axis mirror segment allows the optical port 212 and any folding mirror to be positioned so that they do not obscure the reflected laser beam thereby improving throughput. The second optical element may be a segment of an off-axis dome corrector parent lens, a prism or a segment of an off-axis refractive parent lens. The off-axis reflective transmit telescope provides high throughput, aberration correction and multi-wavelength capability in a simple optical package.

In general, an aspheric surface is one that is not spherical, that is, an aspheric surface cannot be described by simply stating its radius of curvature. A sphere is defined by knowledge of its radius. To describe an asphere, several pieces of information, including its radius, are required. There are different families of aspheric surfaces, the two best known, and probably most commonly used, are (1) conic surfaces and (2) even polynomial aspheres. Parabolas and ellipses are conics—they can be described by the radius of curvature and a conic constant. Surfaces which have a conic constant of −1 are parabolas. Even polynomial (sometimes called higher order) aspheres are described as a base curvature, possibly a conic constant, and terms of $Ar^4+Br^6+Cr^8+\ldots$, where r is the distance from the axis, and A, B, C etc are the aspheric coefficients. Because the surface depends on the distance from the axis raised to a certain order, they are called "higher order aspheres".

The laser beam emitted at the optical port is referred to as the "object". The use of a folding mirror allows the packaging of the optical port (e.g. fiber tip) at a physically convenient location while maintaining the appropriate "apparent object" position. If the rays leaving the folding mirror are extended back they intersect at the position of the "apparent object". It is to be understood that reference to the "object" or "apparent object" are equivalent. For example, either the object or apparent object may be positioned on the axis of a parent parabola mirror at a distance of one-half the radius of curvature so that rays reflected off the parabola are collimated. For each case, the design construct using the parent lenses and mirrors is depicted without a folding mirror and a specific embodiment including the lens and mirror segments is depicted with a folding mirror.

Off-Axis Parabolic Mirror Segment and Off-Axis Dome Corrector Lens Segment

Figure 9:
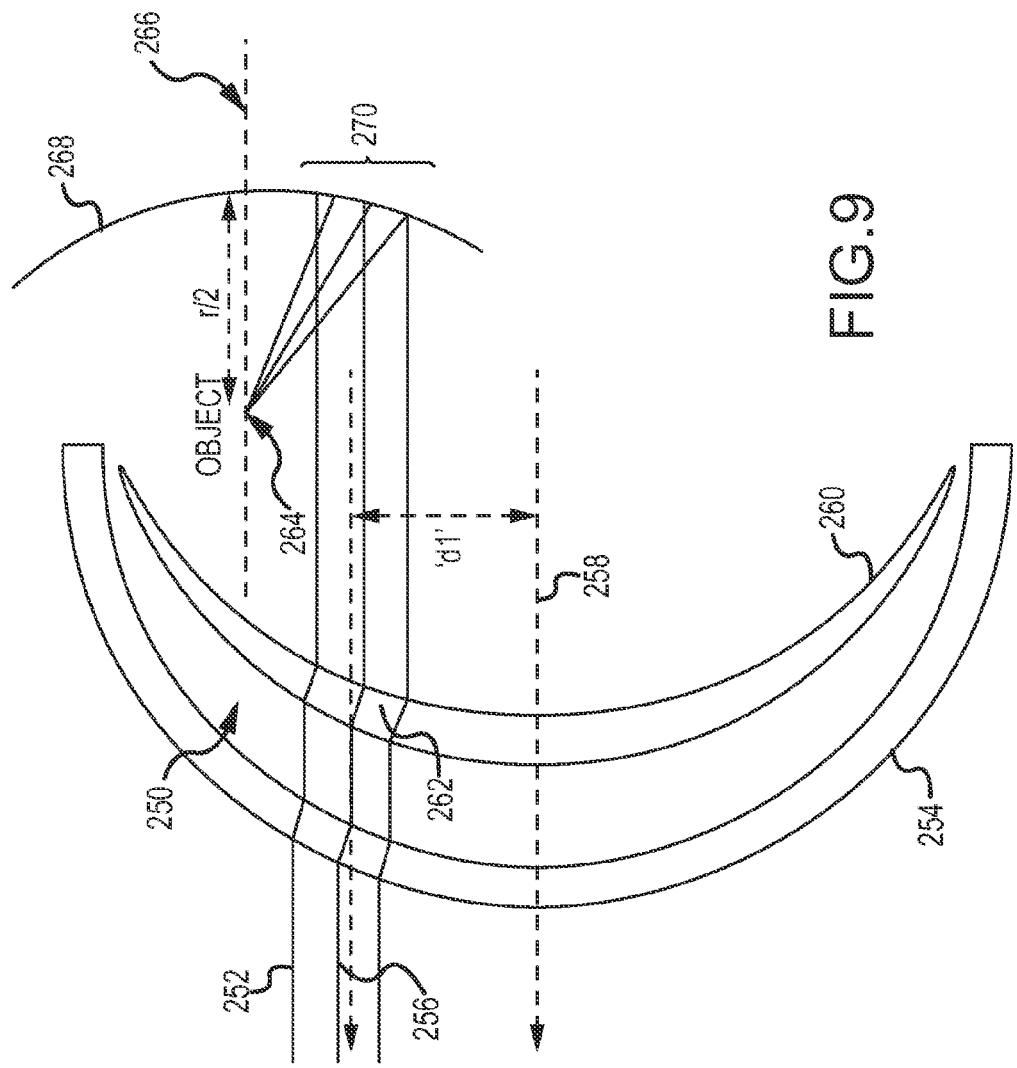
FIG. 9 is a top view of a design construct of the parent lens and parent mirror for a first embodiment of the transmit telescope.

Referring now to FIGS. 9, 10a-10b and 11a-11b in a first embodiment of an off-axis reflective transmit telescope 250 the functions of creating a collimated laser beam and precompensating the collimated laser beam for dome aberrations are separable. Referring now to FIG. 9 and working backwards from a collimated laser beam 252 transmitted from the telescope, a spherical dome 254 induces chromatic and standard aberrations as the laser beam passes there through. These aberrations are induced because the transmit axis 256 is offset by a distance 'd1' from the optical axis 258 of the receive telescope so that the transmit axis is offset by the same distance from the boresight axis when the gimbal is looking directly forward. The receive and transmit telescopes are independent optical systems, sharing only the dome as a common optic element.

Figure 10B:
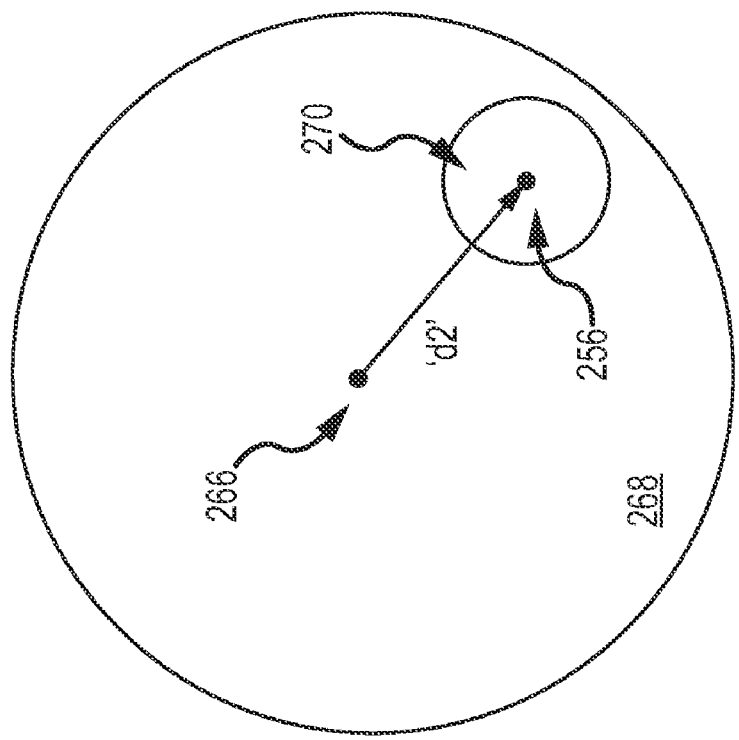
FIGS. 10a and 10b are diagrams illustrating an axial-view of the parent lens and the off-axis dome corrector segment and the parent mirror and the off-axis mirror segment, respectively
Figure 10A:
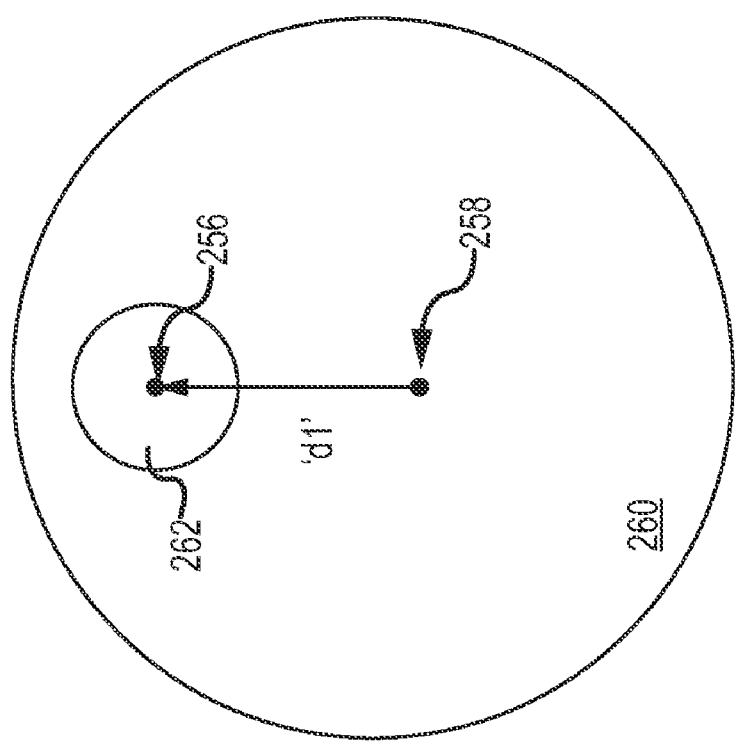

A parent meniscus lens 260 centered on optical axis 258 precompensates a collimated beam passing there through such that the beam leaving the dome remains substantially collimated. The meniscus lens may be designed using standard optical design software such as CodeV or Zemax in which, for example, the thickness of the meniscus lens is varied across the face of the dome until a collimated beam into the meniscus lens remains collimated leaving the dome. As shown in FIGS. 9 and 10a, an off-axis dome corrector segment 262 is a segment of the parent lens corresponding to the offset 'd1' of the transmit axis 256 from optical axis 258 and the diameter of the transmit telescope. Collimated light passing through corrector segment 262 will remain collimated as it leaves the dome.

The dome corrector segment is designed with the seeker looking forward, for the given distance that the transmit beam is offset from the boresight axis of the system. At this neutral position, the optical axis of the receive telescope is coincident with the boresight axis. As the system gimbals around to look off boresight and point the receive telescope's optical axis off boresight, the dome corrector moves as well. As the look direction changes, the corrector is adjacent to a different section of the dome, however because the gimbal center is located at the center of curvature of the dome, the relation between the dome corrector and the dome is maintained for all angular positions. Consequently, the laser beam remains collimated as the look direction changes.

To form the collimated laser beam 252 from a point source, the optical port, which is coincident with the "object" 264, is positioned at a point on the axis of symmetry 266 at a distance of half the radius of curvature 'r' of a parent mirror 268 having a base curvature of a parabola. Light that is emitted from this point towards the parent mirror is reflected as collimated beam 252. The radius 'r' of the parabolic base curvature is set based on the core size of the fiber terminated at the optical port and the desired beam parameters (e.g. diameter and divergence) of the collimated laser beam. To form the collimated laser beam 252 without having either the optical port or the folding mirror (if used) obscure the beam, as shown in FIGS. 9 and 10b parent mirror 268 is decentered so that its axis of symmetry 266 is offset by a distance 'd2' from transmit axis 256. The off-axis mirror segment 270 is a segment of the parent mirror 268 around the transmit axis 256 with the desired beam diameter. The laser beam can be emitted from the optical port (or reflected off a folding mirror) at an angle so that the optical port (and folding mirror) can be positioned outside the diameter of the reflected laser beam.

Figure 11A:
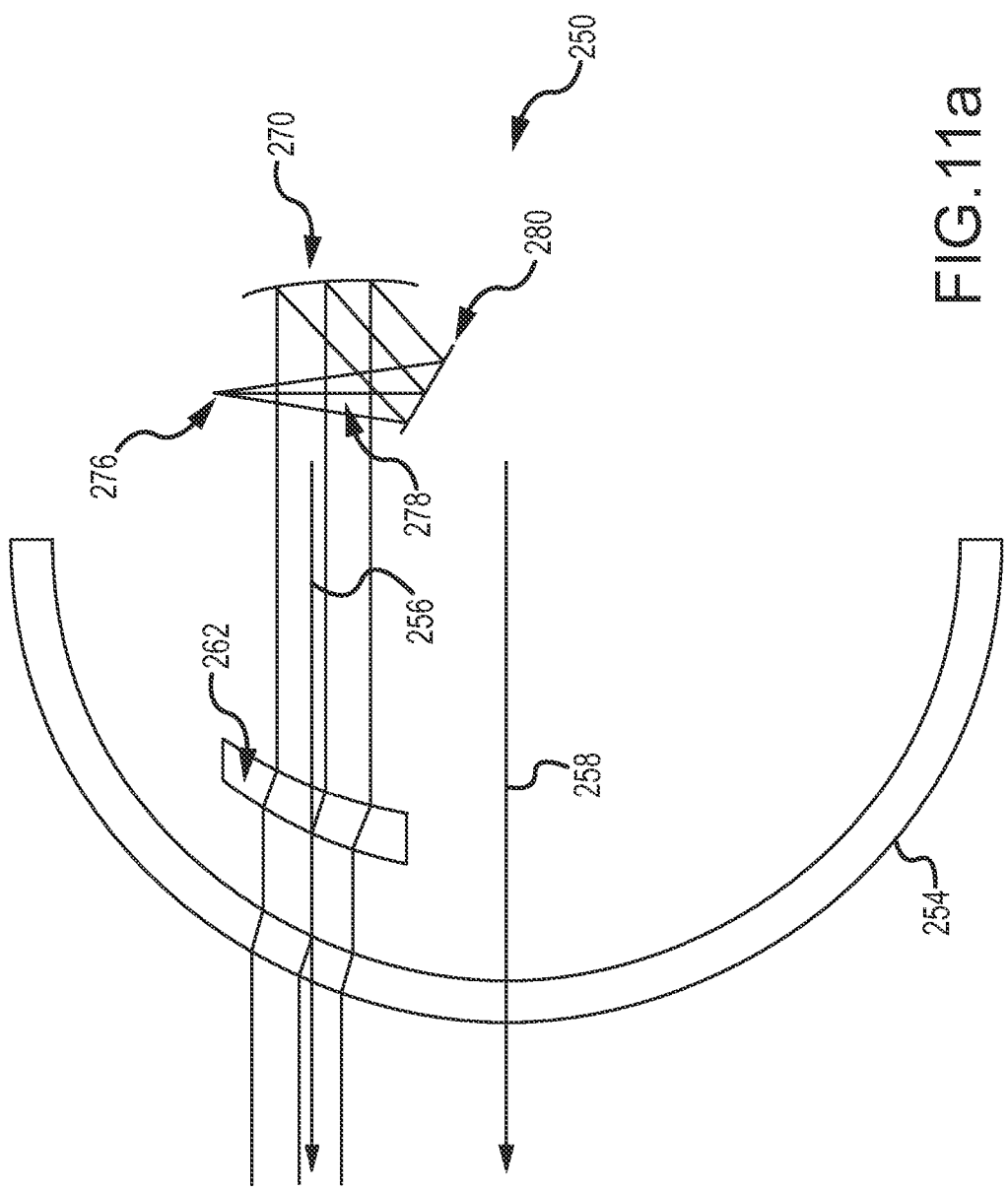
FIGS. 11a and 11b are top and perspective views of the first embodiment of the transmit telescope.
Figure 11B:
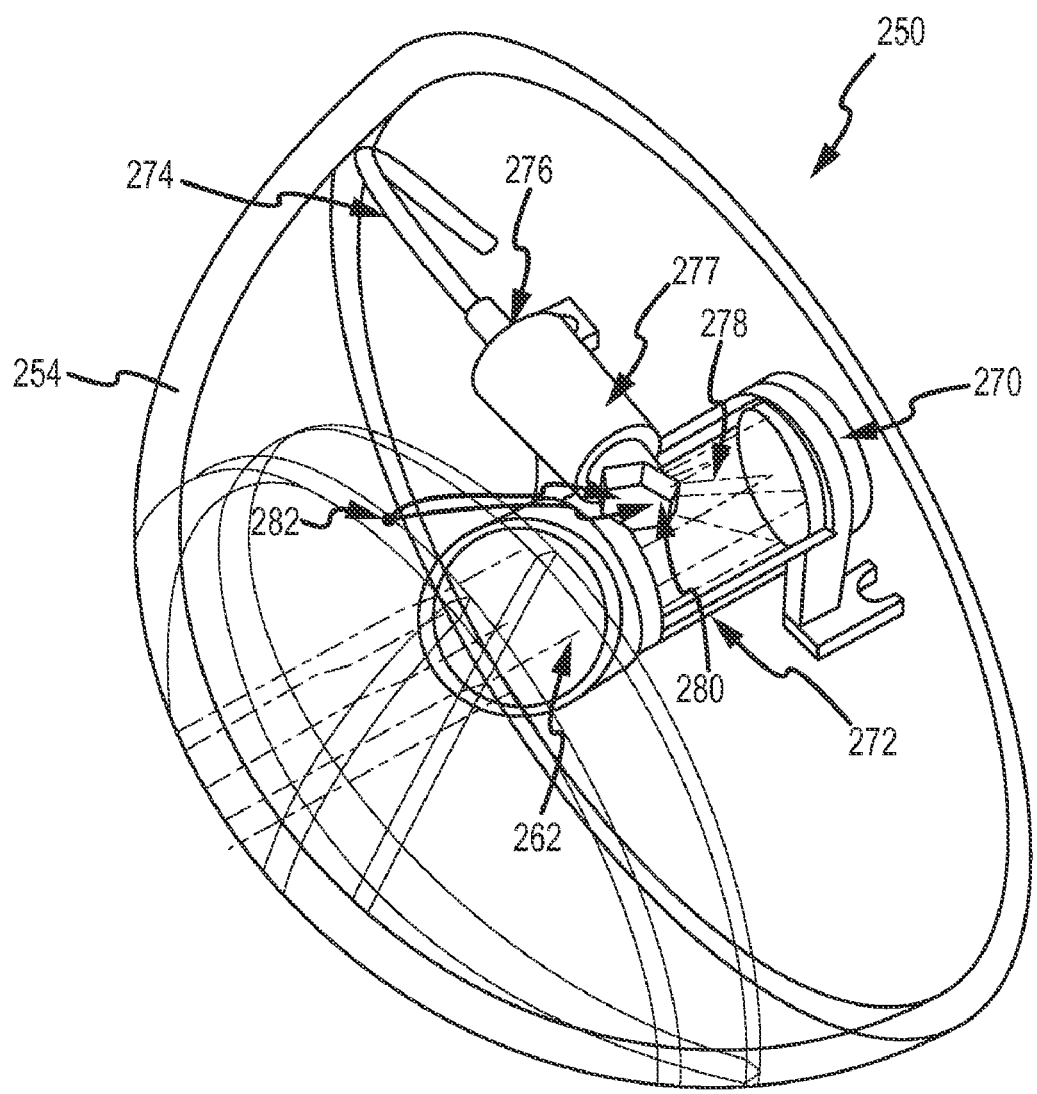

Referring now to FIGS. 11a and 11b, an embodiment of off-axis reflective transmit telescope 250 includes a cylindrical housing 272 mounted on the receive telescope on the nod gimbal. Off-axis dome corrector lens segment 262 is mounted in the fore section of housing 272 with a spacing relationship to dome that is maintained as the look direction changes and off-axis mirror segment 270 is mounted in the aft section of the housing 272. A fiber assembly 274 is terminated at an optical port 276 in port housing 277 mounted on housing 272 to emit a laser beam 278. A folding mirror 280 is mounted on port housing 277 to fold laser beam 278 towards off-axis mirror segment 270. If the rays leaving the folding mirror were extended backwards they would intersect at an "apparent object" 282 positioned on the axis of symmetry of the parent mirror at a distance of one-half the radius of parabolic curvature from the vertex of the parent mirror. As most clearly depicted in FIG. 11b, the use of the off-axis mirror segment 270 allows the optical port and folding mirror to be positioned outside the path of the reflected collimated laser beam 278.

Off-Axis Elliptical Mirror Segment and Prism

In a second embodiment of an off-axis reflective transmit telescope 300 the functions of creating a collimated laser beam and precompensating the collimated laser beam for dome aberrations are shared by a discrete off-axis mirror segment and prism. Referring now to FIG. 12a and working backwards from a collimated laser beam 302 transmitted from the telescope, a spherical dome 304 induces chromatic and standard aberrations as the laser beam passes there through. These aberrations are induced because the transmit axis 306 is offset by a distance 'd' from the optical axis 308 of the receive telescope. The receive and transmit telescopes are independent optical systems, sharing only the dome as a common optic element.

A parent mirror 312 having a base curvature of an ellipse is used to reflect the laser beam 302 through the dome. Parent mirror 312 is decentered so that its axis of symmetry 314 is offset by a distance 'd2' from transmit axis 306. An off-axis mirror segment 316 is a segment of the parent mirror 312 around the transmit axis 306 with the desired beam diameter. An ellipse will provide perfect point to point imagery only between two specific points on its axis 314 (the foci 318 of the ellipse). For all other on axis or off axis points, the imagery will not be perfect, but will contain aberrations based on the location of the object 320. To precompensate for the chromatic aberration, the laser beam is passed through a prism 322. The prism itself induces a standard aberration. The object 320 (e.g. fiber tip), as viewed through the prism, is positioned at a location where the aberrations balance the aberrations created by passing through the prism and the dome. The prism angle and conic constant of the mirror may be allowed to vary to achieve proper correction. The apparent object 324 as seen through the prism is positioned on axis 314.

Referring now to FIG. 12b, an embodiment of off-axis reflective transmit telescope 300 includes a cylindrical housing 330 mounted on the receive telescope on the nod gimbal. Off-axis mirror segment 316 is mounted in the aft section of the housing 330. A fiber assembly (not shown) is terminated at optical port 332 (coincident with object 320) on port housing 333 mounted on housing 330 to emit a laser beam 302 at object 320. Prism 322 is mounted on port housing 333. A folding mirror 336 is mounted on port housing 333 to fold laser beam 302 towards off-axis mirror segment 316. If the rays leaving the folding mirror were extended backwards they would intersect at an "apparent object" positioned on the axis of symmetry of the parent mirror. The use of the off-axis mirror segment 316 allows the optical port and folding mirror to be positioned outside the path of the reflected collimated laser beam 302.

Off-Axis Higher-Order Aspheric Integrated Refractive/Reflective Optical Element

Figure 13A:
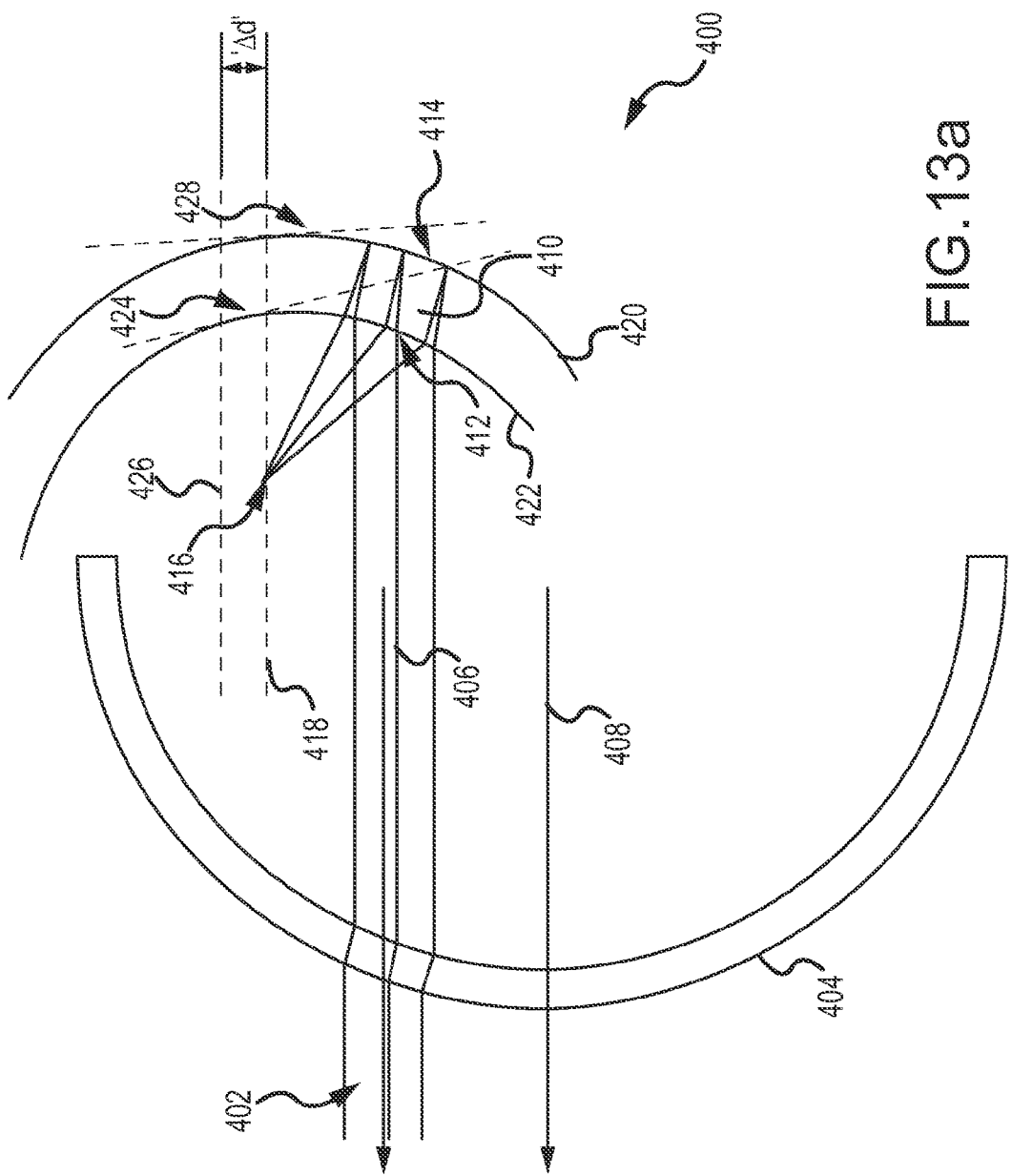
FIGS. 13a and 13b are diagrams illustrating a third-embodiment including a single optical element having a refractive front surface and a reflective back surface that are both aspheric and tilted and decentered with respect to each other and to the transmit axis.

In a third embodiment of an off-axis reflective transmit telescope 400 the functions of creating a collimated laser beam and precompensating the collimated laser beam for dome aberrations are integrated in a single optical element that is both refractive and reflective. Referring now to FIG. 13a and working backwards from a collimated laser beam 402 transmitted from the telescope, a spherical dome 404 induces chromatic and standard aberrations as the laser beam passes there through. These aberrations are induced because the transmit axis 406 is offset by a distance 'd' from the optical axis 408 of the receive telescope. The receive and transmit telescopes are independent optical systems, sharing only the dome as a common optic element.

The reflective optical assembly comprises an off-axis optical element 410 having an off-axis refractive front surface segment 412 and an off-axis reflective back surface segment 414 having different higher-order aspheric curvatures that are tilted and decentered with respect to each other and with respect to the transmit axis 406. Object 416 (e.g. the fiber tip terminated at the optical port) is position on an axis of symmetry 418 of the parent mirror 420 so that the laser beam passes through the refractive front surface reflects off the reflective back surface and passes back through the refractive front surface to precompensate the reflected laser beam for the dome aberrations.

Optical element 410 is suitably a piece of optical material that is transmissive at the desired wavelengths that has been machined to form the tilted and decentered front and back surfaces with a reflective coating formed on the back surface.

To better understand an exemplary design construct, consider the front surface as a parent aspheric lens 422 'S1' and the back surface as a parent aspheric mirror 420 'S2'. Initially surfaces S1 and S2 are centered on a line parallel to the transmit axis. Surface S1 is tilted towards the dome as indicated by the tilt of line 424 that is drawn perpendicular to the axis of symmetry 426 of S1. Surface S2 is tilted towards the dome (to a less degree) and decentered by 'Δd' towards the transmit axis as indicated by the tilt of line 428 that is drawn perpendicular to the axis of symmetry 418. For example, in an embodiment S1 is tilted 15 degrees from perpendicular and S2 is tilted 4 degrees from perpendicular and decentered by approximately 0.3 inches. The direction and amount of tilt and the direction and amount of decentering is application specific depending on the offset of the transmit telescope, the aberration compensation required as well as other beam parameters. Off-axis refractive front surface segment 412 and off-axis reflective back surface segment 414 are segments of the respective parent lens 422 and parent mirror 420 centered about the transmit axis 406.

Figure 13B:
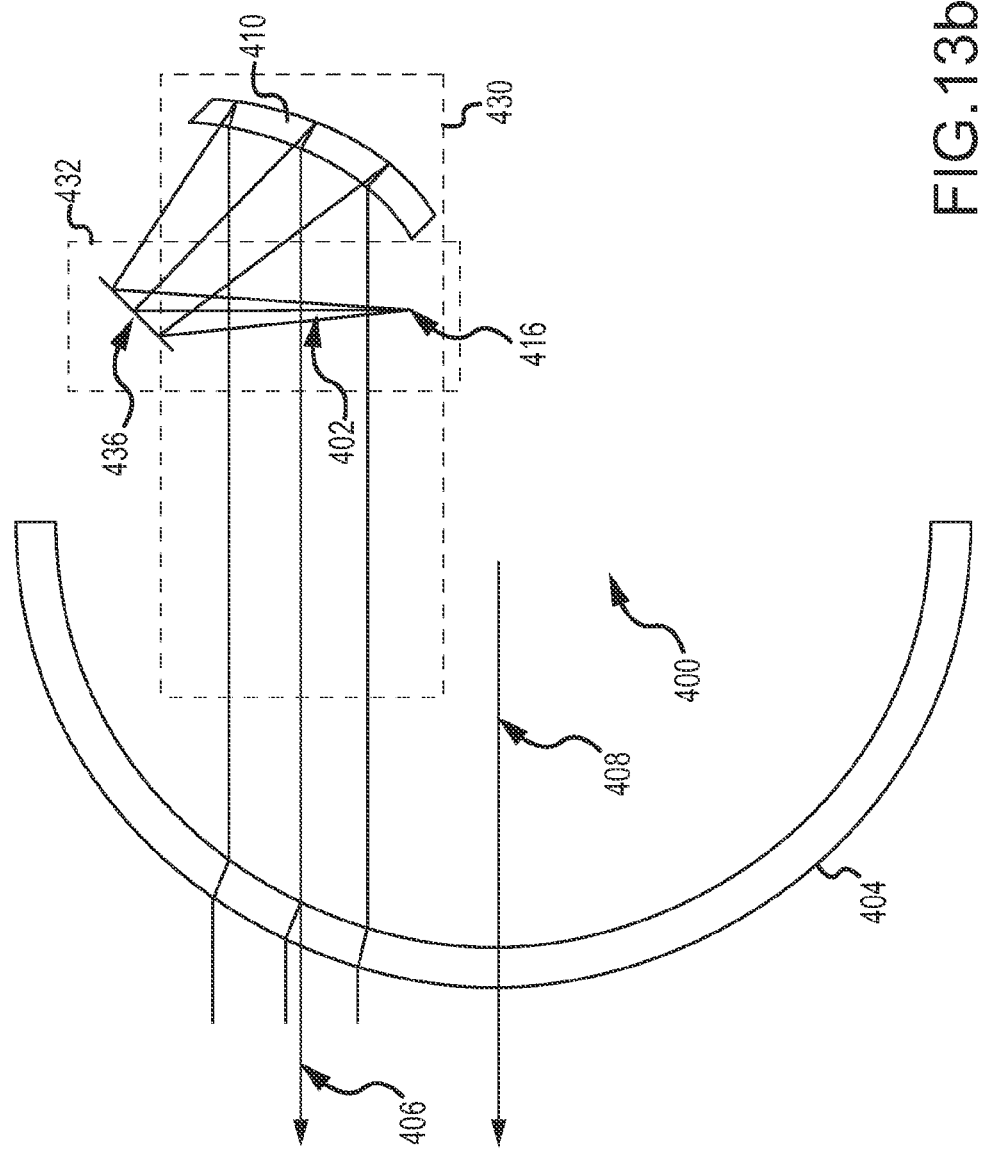

Referring now to FIG. 13b, an embodiment of off-axis reflective transmit telescope 400 includes a cylindrical housing 430 mounted on the receive telescope on the nod gimbal. Optical element 410 is mounted in the aft section of the housing 430. A fiber assembly (not shown) is terminated at optical port 432 mounted on housing 430 to emit a laser beam 402 from object 416. A folding mirror 436 is mounted on optical port 432 to fold laser beam 402 towards optical element 410 so that the laser beam passes through the refractive front surface reflects off the reflective back surface and passes back through the refractive front surface to precompensate the reflected laser beam for the dome aberrations. If the rays leaving the folding mirror were extended backwards they would intersect at an "apparent object" positioned on the axis of symmetry of the parent mirror. The use of the off-axis optical element 410 allows the optical port and folding mirror to be positioned outside the path of the reflected collimated laser beam 402.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A directed infrared countermeasures (DIRCM) system for use on an aircraft to track and jam a missile having a seeker, comprising:
   a dome;
   a two-axis gimbal configured to slew and point an optical axis;
   a receive telescope on the gimbal having a line-of-sight along said optical axis to receive incident radiation;
   a detector optically coupled to the receive telescope;
   a laser configured to emit a modulated laser beam in a transmit band;
   an optical fiber assembly having a first end coupled to the laser to receive and guide the laser beam and a second end;
   a transmit telescope mounted on the gimbal along a transmit axis offset laterally from the optical axis but nominally aligned with the line-of-sight of the receive telescope, said telescope comprising an optical port offset from the transmit axis and optically coupled to the second end of the optical fiber assembly to emit the laser beam, a fixed off-axis mirror segment that reflects the laser beam as a collimated beam toward the dome and a fixed off-axis dome corrector that precompensates for dome aberrations induced in the beam by the lateral offset of the transmit telescope from the optical axis to transmit a collimated laser beam, wherein said off-axis dome corrector lens segment comprises a segment of a parent meniscus lens that corrects aberrations over the dome, said lens segment corresponding to the lateral offset of the transmit telescope from the optical axis, and wherein said off-axis mirror comprises a segment of a parent mirror having a parabolic base curvature about an axis of symmetry, said mirror segment corresponding to an offset from the axis of symmetry that lies on the transmit axis whereby the optical port does not obscure the reflected laser beam; and a processor that processes the incident radiation from the detector to slew the gimbal to track a missile and engages the laser to emit the modulated laser beam through the transmit telescope to jam the missile's seeker.

2. The DIRCM system of claim 1, wherein said transmit telescope further comprises a folding mirror that redirects the emitted laser beam onto the off-axis mirror segment, said folding mirror offset from the transmit axis to avoid obscuring the reflected laser beam.

3. The DIRCM system of claim 2, wherein a reflective optical assembly comprises only the folding mirror, the off-axis mirror segment and the off-axis dome corrector lens segment.

4. A directed infrared countermeasures (DIRCM) system for use on an aircraft to track and jam a missile having a seeker, comprising:
   a dome;
   a two-axis gimbal configured to slew and point an optical axis;
   a receive telescope on the gimbal having a line-of-sight along said optical axis to receive incident radiation;
   a detector optically coupled to the receive telescope;
   a laser configured to emit a modulated laser beam in a transmit band;
   an optical fiber assembly having a first end coupled to the laser to receive and guide the laser beam and a second end;
   a transmit telescope mounted on the gimbal along a transmit axis offset laterally from the optical axis but nominally aligned with the line-of-sight of the receive telescope, said telescope comprising an optical port offset from the transmit axis and optically coupled to the second end of the optical fiber assembly to emit the laser beam, a prism that precompensates the laser beam for a dome chromatic aberration and induces a standard aberration and an off-axis mirror segment having an elliptical base curvature that reflects the laser beam removing the standard aberration and precompensates the beam for a dome standard aberration to transmit a collimated laser beam; and
   a processor that processes the incident radiation from the detector to slew the gimbal to track a missile and engages the laser to emit the modulated laser beam through the transmit telescope to jam the missile's seeker.

5. The DIRCM system of claim 4, wherein said off-axis mirror segment comprises a segment of a parent mirror having an elliptical base curvature with first and second foci on an axis of symmetry, said mirror segment corresponding to an offset from the axis of symmetry that lies on the transmit axis whereby the optical port lying off said first and second foci and the prism do not obscure the reflected laser beam.

6. The DIRCM system of claim 4, wherein said transmit telescope further comprises a folding mirror that redirects the emitted laser beam onto the off-axis mirror segment, said folding mirror offset from the transmit axis to avoid obscuring the reflected laser beam.

7. The DIRCM system of claim 6, wherein a reflective optical assembly comprises only the folding mirror, the off-axis mirror segment and the prism.

8. A directed infrared countermeasures (DIRCM) system for use on an aircraft to track and jam a missile having a seeker, comprising:
   a dome;
   a two-axis gimbal configured to slew and point an optical axis;
   a receive telescope on the gimbal having a line-of-sight along said optical axis to receive incident radiation;
   a detector optically coupled to the receive telescope;
   a laser configured to emit a modulated laser beam in a transmit band;
   an optical fiber assembly having a first end coupled to the laser to receive and guide the laser and a second end;
   a transmit telescope mounted on the gimbal along a transmit-axis offset laterally from the optical axis but nominally aligned with the line-of-sight of the receive telescope, said telescope comprising an optical port offset from the transmit axis and optically coupled to the second end of the optical fiber assembly to emit the laser beam and an optical element comprising an off-axis refractive front surface and an off-axis reflective back surface having different aspheric curvatures that are tilted and decentered with respect to each other and with respect to the transmit axis, said laser beam passes through the refractive front surface reflects off the reflective back surface and passes back through the refractive front surface to precompensate the reflected laser beam for dome aberrations induced in the laser beam by the lateral offset of the transmit telescope from the optical axis to transmit a collimated laser beam, wherein said optical port is positioned so that it does not obscure the reflected laser beam; and
   a processor that processes the incident radiation from the detector to slew the gimbal to track a missile and engages the laser to emit the modulated laser beam through the transmit telescope to jam the missile's seeker.

9. The DIRCM system of claim 8, wherein said transmit telescope further comprises a folding mirror that redirects the emitted laser beam onto the off-axis mirror segment, said folding mirror offset from the transmit to avoid obscuring the reflected laser beam.

10. The DIRCM system of claim 9, wherein a reflective optical assembly comprises only the folding mirror and the second optical element with the off-axis mirror segment thereon.

11. The DIRCM system of claim 8, wherein said off-axis refractive front surface and said off-axis refractive back surface comprise different segments of an aspheric parent lens and an aspheric parent mirror, respectively, corresponding to different offsets from the axes of the parent lens and parent mirror so that the refractive and reflective surfaces are decentered with respect to each other and the optical port does not obscure the reflected laser beam.

* * * * *